(12) United States Patent
Shiraishi

(10) Patent No.: US 7,043,377 B2
(45) Date of Patent: May 9, 2006

(54) POWER-SAVING EFFECT DISPLAY DEVICE IN AN INVERTER DEVICE

(75) Inventor: Yasuhiro Shiraishi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/510,945

(22) PCT Filed: Jun. 25, 2003

(86) PCT No.: PCT/JP03/08037

§ 371 (c)(1),
(2), (4) Date: Oct. 13, 2004

(87) PCT Pub. No.: WO2005/002035

PCT Pub. Date: Jan. 6, 2005

(65) Prior Publication Data

US 2005/0154543 A1 Jul. 14, 2005

(51) Int. Cl.
*G01R 15/00* (2006.01)
*H02M 3/24* (2006.01)

(52) U.S. Cl. .......................... 702/57; 318/801; 363/95
(58) Field of Classification Search ............... 318/801, 318/803; 324/522, 142; 702/61, 64, 65, 702/57, 58, 60; 363/95–98

See application file for complete search history.

(56) References Cited

U.S. PATENT DOCUMENTS

| 5,268,832 | A | * | 12/1993 | Kandatsu ................... 363/95 |
| 6,111,767 | A | * | 8/2000 | Handleman ................. 363/95 |
| 6,493,246 | B1 | * | 12/2002 | Suzui et al. ................. 363/95 |
| 6,678,620 | B1 | | 1/2004 | Tamai et al. |
| 2001/0005320 | A1 | * | 6/2001 | Ueda et al. ................... 363/95 |

FOREIGN PATENT DOCUMENTS

| JP | 11-206188 A | 7/1999 |
| JP | 11-235050 A | 8/1999 |
| JP | 2001-004677 A | 1/2001 |
| JP | 2001-155083 A | 6/2001 |
| JP | 2001-355577 A | 12/2001 |
| JP | 2003-006288 A | 1/2003 |

\* cited by examiner

*Primary Examiner*—Marc S. Hoff
*Assistant Examiner*—Paul Kim
(74) *Attorney, Agent, or Firm*—Sughrue Mion, PLLC

(57) ABSTRACT

A power-saving effect displaying unit includes a power-consumption computing unit that calculates power consumption based on a voltage obtained by an output-voltage computing unit and a current obtained by a current detecting unit. A power-saving-effect generating unit acquires a power-saving effect based on the power consumption. A display displays an instantaneous power-saving effect and an integration value of the power-saving effect under operation with the inverter, with respect to commercial operation, based on the instantaneous power consumption under the operation with the inverter calculated by the power-consumption computing unit, and on electric characteristic data obtained by comparing with the power consumption under the commercial operation.

6 Claims, 5 Drawing Sheets

POWER-SAVING EFFECT DISPLAY DEVICE IN AN INVERTER DEVICE

TECHNICAL FIELD

Present invention relates to a power-saving effect displaying unit in an inverter that performs energy-saving operation.

BACKGROUND ART

Recently, as part of the measure against global warming, various energy conservation measures have been cried out. One of such measures includes use of inverters for power-saving. Various other technologies have also been proposed in association with the trend. For example, in Japanese Patent Application Laid-Open Publication No. 2001-155083, discloses a technology that provides, in a facility that is subject to measurement of its power consumption, measuring devices such as ammeters and voltmeters, and a data collecting system that collects and processes the values detected by the measuring devices. Furthermore, power consumption as data corresponding to the volume of air before and after introduction of an inverter is collected, and from that data the data collecting system calculates a difference in the power consumption before and after the introduction of the inverter. In short, in this technology, the difference between the power consumptions when the inverter is used and not used is used to determine the contribution of the inverter to the power saving.

In this technology, to display how much power has been saved, a display device and the like are required to be additionally provided besides both the subject facility and an installed equipment. That is, peripheral equipment for power measurement and a computer for processing data and the like are separately required conventionally besides the inverter in order to display power-saving effects. In addition, a data transmitting unit that transmits the data from the subject facility to the computer is required, which leads to increase in the costs. Furthermore, when it is necessary to intermittently communicate with the computer, there are disadvantages that the sampling of the power consumption becomes rough and an integration error becomes large.

When monitoring the difference between the power consumptions, that is, power-saving effects, it would be significantly convenient if current values and voltage values detected in the inverter itself, precisely, inside the control circuit of the inverter, can be used. It would be further convenient if a central processing unit (CPU) of the inverter can be used for the sampling.

Still further, even when an environmental change and a secular change occur in the inverter or in the subject facility, or even when a load change occurs in the inverter, it is possible to keep a margin of error small if monitoring is carried out according to these changes. However, data at the time of commercial use without the inverter includes values that have been measured in advance, and that includes values of the power consumption corresponding to volume of air. Because a change in current value that can be caused by an environmental change and the like is not considered in the data, a large margin of error occurs in the data with respect to the actual state. Moreover, if, for example, a motor of 22 kilo watts (kW) is used in anticipation of a load of 22 kW, and if a load of 11 kW is actually applied to the motor, the margin of error becomes larger in the data at the time of commercial use as shown in FIG. 5 because inverter control of 11 kW is carried out for the load of 22 kW instead of the load of 11 kW.

Patent Literatures

Japanese Patent Application Laid-Open Publication No. 2001-4677

Japanese Patent Application Laid-Open Publication No, H11-206188

Japanese Patent Application Laid-Open Publication No. 2001-355577

Accordingly, an object of the present invention is to provide a power-saving effect displaying unit in an inverter that carries out monitoring and sampling and that has a reduced error even when an environmental change and a secular change occur in a subject facility, or even when a load change occurs in the inverter.

DISCLOSURE OF THE INVENTION

A power-saving effect displaying unit according to an aspect of the present invention is used in an inverter that changes operation frequencies of a three-phase alternating current electric motor. The power-saving effect displaying unit includes a power-consumption computing unit that calculates power consumption based on an output voltage, which is calculated by an output-voltage computing unit using an output frequency and a bus voltage, and an output current of the inverter; and a power-saving-effect generating unit that generates an instantaneous power-saving effect, at the time of inverter operation with respect to commercial operation, from electric characteristic data that result from a comparison of instantaneous power consumption at the time of inverter operation and power consumption at the time of commercial operation both calculated by the power-consumption computing unit.

In the power-saving effect displaying unit in an inverter according to the next aspect, the power-saving-effect generating unit further calculates an integration of the power-saving effect to obtain an integration value.

The power-saving effect displaying unit in an inverter according to next invention further includes an arrangement that displays at least one of the power-saving effect and an integration value that is calculated by integrating the power-saving effect obtained by the power-saving-effect generating unit.

The power-saving effect displaying unit in an inverter according to next invention further includes an arrangement that displays at least one of the power-saving effect and the integration value obtained by the power-saving-effect generating unit.

A power-saving effect displaying unit according to an aspect of the present invention is used in an inverter that changes operation frequencies of a three-phase alternating current electric motor. The power-saving effect displaying unit includes a power-consumption computing unit that calculates power consumption based on a voltage obtained by an output-voltage computing unit and a current obtained by a current detecting unit; and a power-saving-effect generating unit that generates a power-saving effect based on the power consumption. The power-saving effect that can be obtained under operation with an inverter with respect to commercial operation is displayed based on electric characteristic data that is obtained by comparing an instantaneous power consumption under the operation with the inverter and an instantaneous power consumption under commercial operation that are calculated by the power-consumption computing unit, and the power-saving effect is calculated by multiplying a difference between an electric characteristic under general damper control and an electric characteristic under the operation with the inverter, representing electric characteristic data and resulting from the comparison with power consumption under the commercial operation by a ratio between power consumption the operation with the inverter calculated every sampling period and the electric characteristic that represents power consumption at the time of general inverter operation.

BEST MODE FOR CARRYING OUT THE INVENTION

Hereinafter, an embodiment of a power-saving effect displaying unit in an inverter according to the present invention will be explained in detail with reference to drawings. The present invention is not to be limited to this embodiment.

EMBODIMENT

Figure 1:
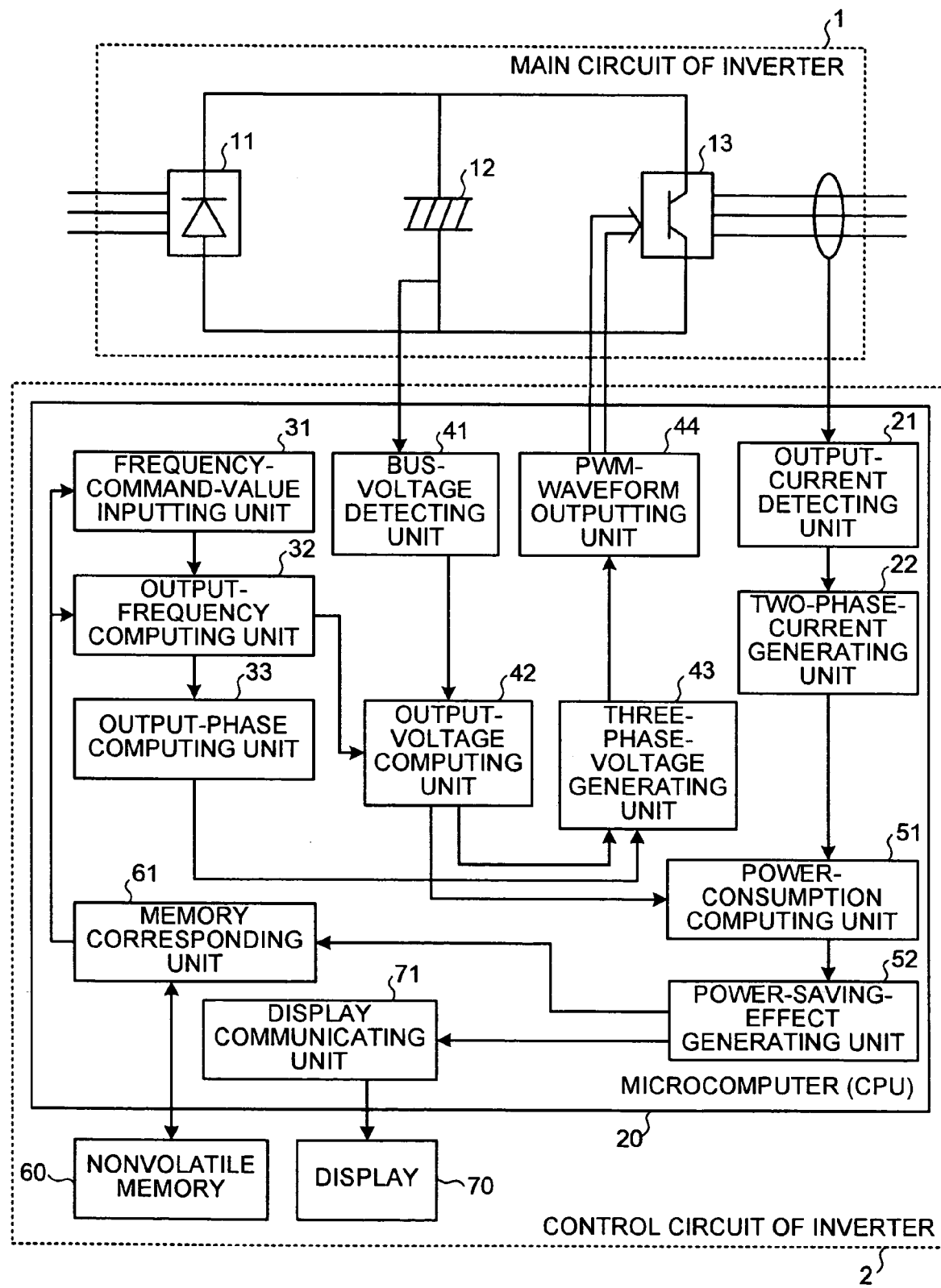
FIG. 1 is a block diagram that represents an embodiment according to the present invention.

FIG. 1 is a block diagram of a power-saving effect displaying unit according to an embodiment of the present invention. The power-saving effect displaying unit includes a main circuit 1 of an inverter and a control circuit 2 of the inverter. A power-source side of the main circuit 1 is connected to a commercial power source (not shown) and a load side is connected to, for example, an induction motor (not shown). The main circuit 1 includes an inverter 13 and the inverter 13 includes a switching element. The control circuit 2 controls on/off of the switching element in the inverter 13 of the main circuit 1. The main circuit 1 also includes a converter 11 that converts an alternating voltage into a direct voltage, a condenser 12 that smoothes the direct voltage, and the inverter 13 that includes a transistor and a diode that serve as the switching element for converting the alternating voltage into the direct voltage.

The control circuit 2 includes a microcomputer (hereinafter, "CPU") 20, a nonvolatile memory 60, and a display 70. The nonvolatile memory 60 and the display 70 are connected to the CPU 20. The CPU 20 stores software to realize each unit in advance, and has a function that outputs waveform information of pulse-width modulation (PWM) to the inverter 13.

The CPU 20 performs the functions of:
  an output-current detecting unit 21 that detects output currents of the inverter 13, that is, detects values of a U-phase, a V-phase, and a W-phase of the output current of the inverter 13;
  a two-phase-current generating unit 22 that converts a three-phase current obtained by the output-current detecting unit 21 into two-phase currents Id and Iq according to phases;
  a frequency-command-value inputting unit 31 that detects a frequency command value input in an analogue value or a digital value from outside;
  an output-frequency computing unit 32 that calculates an output frequency from both the frequency command value detected by the frequency-command-value inputting unit 31 and an adjustable speed time;
  an output-phase computing unit 33 that calculates a phase angle from the output frequency calculated by the output-frequency computing unit 32 according to processing time of software;
  a bus-voltage detecting unit 41 that detects voltages at both ends of the condenser 12 in the main circuit 1;
  an output-voltage computing unit 42 that corrects output voltages according to the values of the bus voltages detected by the bus-voltage detecting unit 41, and that calculates output voltages Vd and Vq corresponding to the output frequencies calculated by the output-frequency computing unit 32;
  a three-phase-voltage generating unit 43 that generates three-phase voltages output to the U-phase, the V-phase, and the W-phase that are outputs of the inverter, using the phase determined by the output-phase computing unit 33 and the voltage determined by the output-voltage computing unit 42; and
  a PWM-waveform outputting unit 44 that compares each of the three-phase voltages obtained by the three-phase-voltage generating unit 43 to a triangular wave to create three-phase switching signals for carrying out on/off of the transistor of the inverter 13, and outputs the switching signals to the inverter 13.

The CPU 20 also performs the functions of:
  a power-consumption computing unit 51 that calculates a value of power consumption from Id and Iq obtained by the two-phase-current generating unit 22, and the output voltages Vd and Vq obtained by the output-voltage computing unit 42;
  a power-saving-effect generating unit 52 that stores data of electrical characteristic under operation with an inverter and operation in commercial use are compared, and that determines a power-saving effect from the value of the power consumption obtained by the power-consumption computing unit 51;
  a display communicating unit 71 to display the power-saving effect obtained by the power-saving-effect generating unit 52 on the display 70; and
  a memory corresponding unit 61 to store the power-saving effect in the nonvolatile memory 60. The memory corresponding unit 61 is to read and write data from and to the nonvolatile memory 60.

The operation of the power-saving effect displaying unit will be explained now. In the CPU 20, when a frequency to be output is input in the frequency-command-value inputting unit 31, the frequency-command-value inputting unit 31 converts the frequency command value information, which is obtained from the outside, into a data format of frequency set value that can be handled in the CPU 20. The frequency-command-value inputting unit 31 then sends the obtained frequency set value to the output-frequency computing unit 32. The output-frequency computing unit 32 calculates an actual output frequency based on the frequency set value and the adjustable speed time information that has been stored in the nonvolatile memory 60 according to the internal state such as under acceleration, under constant speed, and under deceleration speed. The output-phase computing unit 33 sets up an output phase based on the data of output frequency according to the computing period of the CPU 20.

On the other hand, the bus-voltage detecting unit 41 detects bus voltages of the main circuit 1 at all times, and converts the detected values into a voltage data format that can be handled in the CPU 20, and then, sends the data to the output-voltage computing unit 42. The output-voltage computing unit 42 performs correction that corresponds to the bus voltage obtained by the bus-voltage detecting unit 41 to the output voltage that corresponds to the output frequency calculated by the output-frequency computing unit 32, based on the relational expression of the output frequency/output voltage that has been stored in the nonvolatile memory 60. The output-voltage computing unit, then, determines the output voltages Vd and Vq.

When the actual output phase and the output voltage are determined, the three-phase voltage generating unit 43 performs two-phase/three-phase conversion to both the data, and generates three-phase voltages to be output to each of the U-phase, the V-phase, and the W-phase. The three-phase voltages obtained are transferred to the PWM-waveform outputting unit 44. The PWM-waveform outputting unit 44 compares each of the three-phase voltages to a triangular wave, and creates three-phase switching signals for performing out on/off of the transistor of the inverter 13. The PWM-waveform outputting unit 44, then, outputs the switching signals to the inverter 13.

On the other hand, the three-phase output current detected by the output-current detecting unit 21 is transferred to the two-phase-current generating unit 22 and converted into two-phase currents Id and Iq according to phases. Then, the two-phase currents Id and Iq are transferred to the power-consumption computing unit 51. In power-consumption computing unit 51, the power consumption under the operation with the inverter is calculated from the following equation (1) using the two-phase currents Id and Iq obtained by the two-phase-current generating unit 22, and the output voltages Vd and Vq obtained by the output-voltage computing unit 42. An instantaneous power consumption P' is as follows:

$$P'=K*|Vq*Iq+Vd*Id| \quad (1)$$

where K is a coefficient that represents a loss in the inverter. As is described, the power-consumption computing unit 51 calculates the instantaneous power consumption P' under the operation with the inverter.

Figure 2:
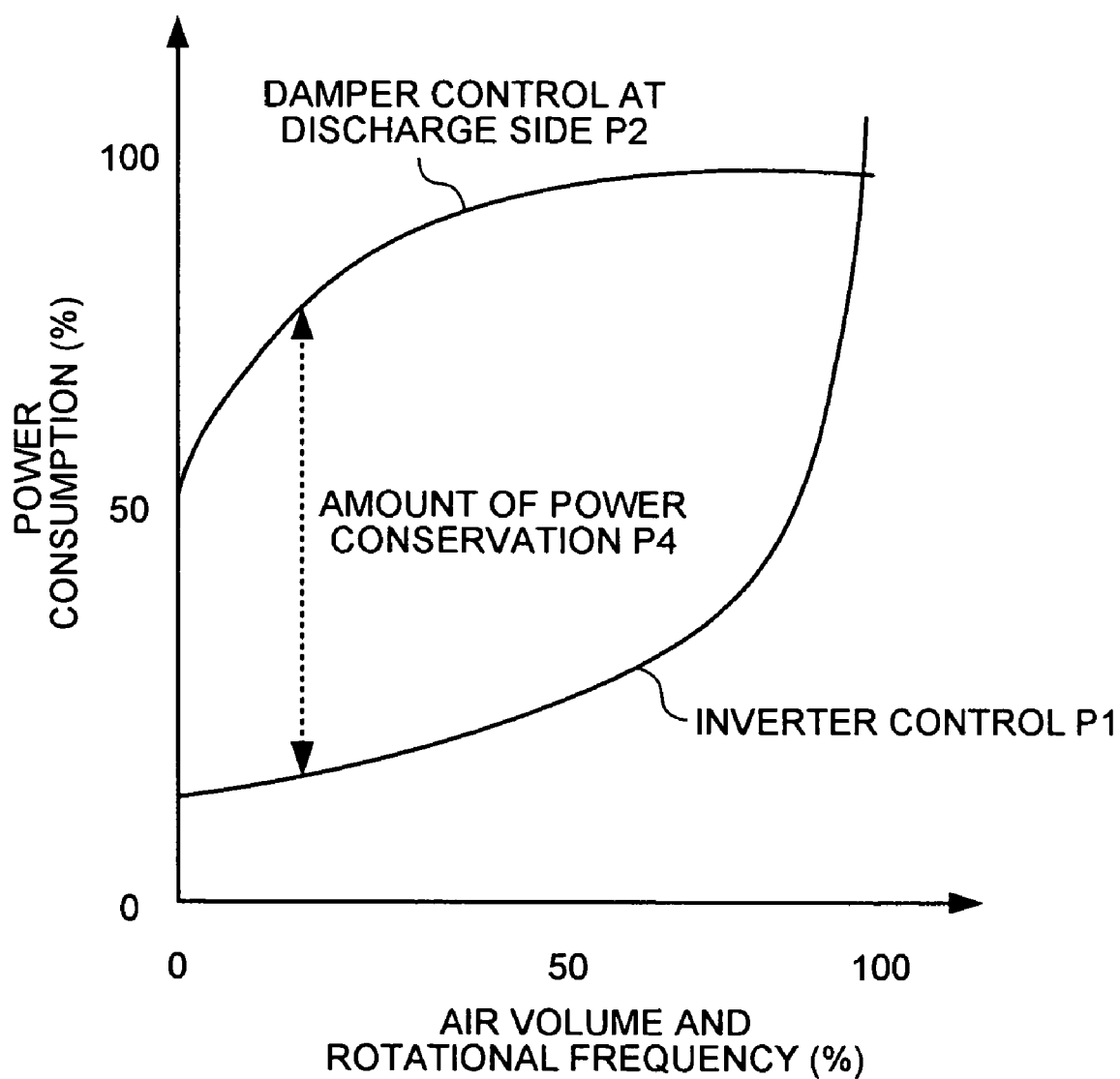
FIG. 2 is a characteristic diagram that represents one example of power characteristic data.
Figure 3:
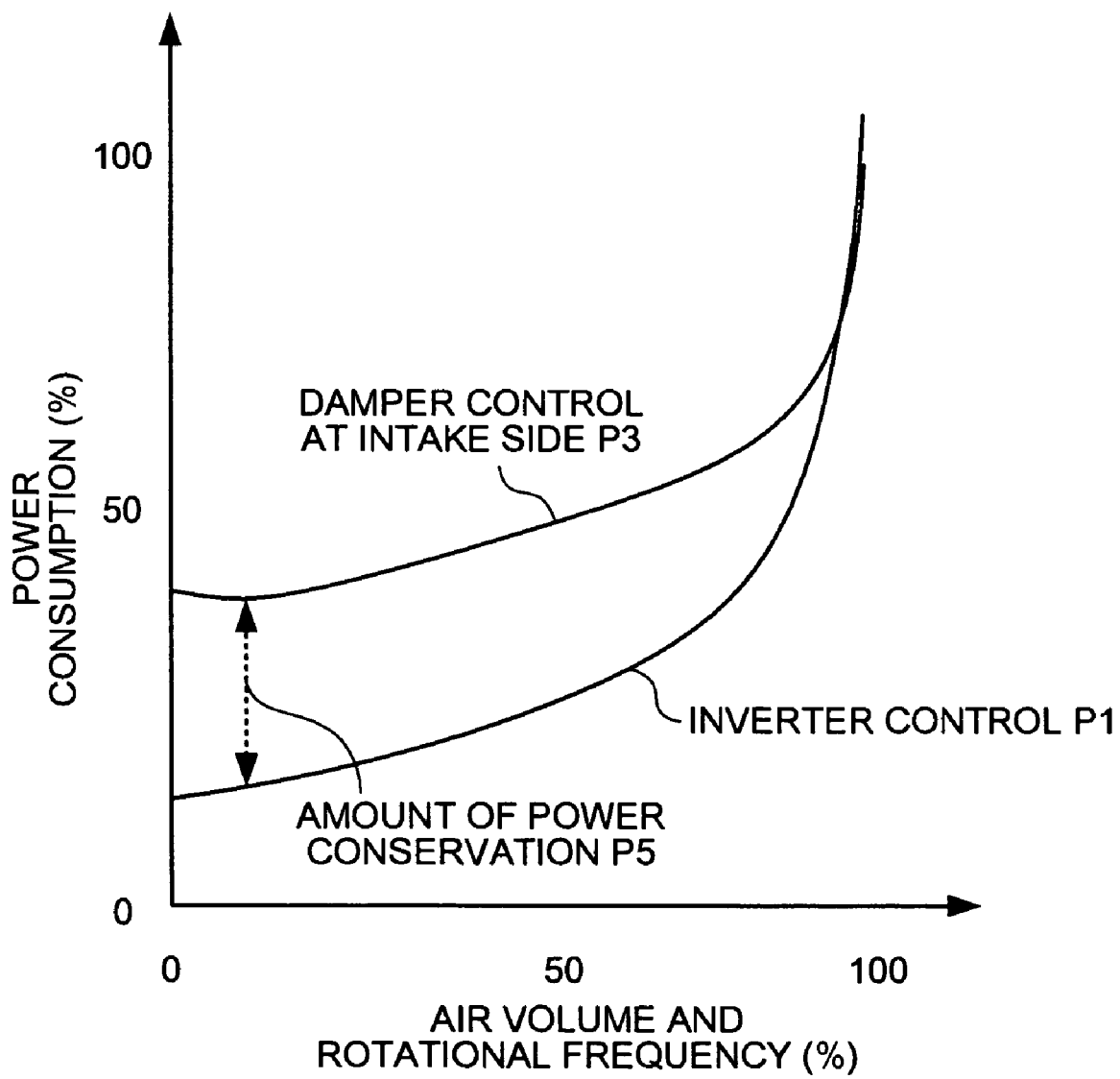
FIG. 3 is a characteristic diagram that represents another example of the power characteristic data.

The power-saving-effect generating unit 52 will be explained next. FIG. 2 represents characteristics of power consumption P2 under control of the damper, which is generally known, at a discharge side in commercial operation, and P1 under the operation with the inverter with respect to the volume of the air. FIG. 3 represents characteristics of power consumption P3 under control of the damper at an intake side in commercial operation, and P1 under the operating with the inverter with respect to the volume of the air. Furthermore, in FIGS. 2 and 3, each of P4 and P5 represents differences between the power consumption under the damper control and the power consumption under the operation with the inverter with respect to the air volumes in commercial operation. P4 and P5 are as follows:

The difference when the power consumption under the operation with the inverter is compared to the power consumption under control of the damper at the discharge side;

$$P4=P2-P1 \quad (2)$$

The difference when the power consumption under the operation with the inverter is compared to the power consumption under control of the damper at the intake side;

$$P5=P3-P1 \quad (3)$$

The power-saving-effect generating unit 52 has the data of the power consumption differences P4 and P5. It is possible to select which one of the differences P4, which is of the damper at the discharge side, and P5, which is of the damper at the intake side, to be applied for computation. The power-saving-effect generating unit 52 calculates the power consumption differences P4 and P5 according to the output frequencies of the inverter, and calculates a power-saving effect ΔP in the following equation (4):

$$\Delta P = P4*P'/P1 \text{ or } P5*P'/P1 \quad (4)$$

The power-saving effect that is obtained using the equation (4) is an amount of the power conservation that is obtained by converting the difference in power consumption, as the characteristic, into the power consumption of the actual operation with the inverter. Therefore, it is the difference in the power consumption under the actual operation with the inverter.

Furthermore, the power-saving effects ΔP are accumulated after every predetermined time interval. An integration value of the power-saving effect, that is an amount of the power conservation for a certain period of time, is calculated as ΣΔP using the following equation (5):

$$\Sigma \Delta P = \Delta P1 + \Delta P2 + \Delta P3 + \ldots + \Delta Pn + \ldots \quad (5)$$

Figure 4:
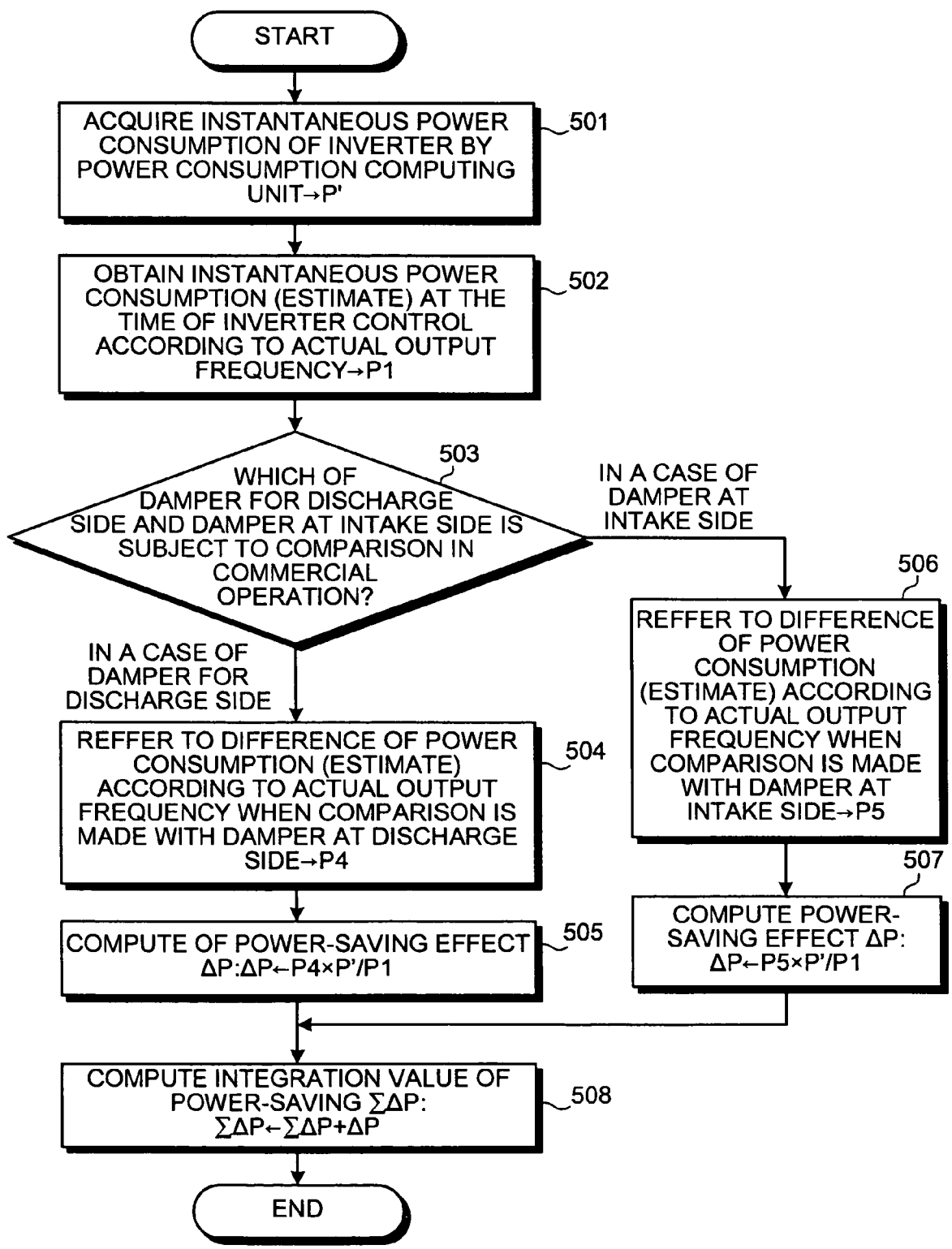
FIG. 4 is a flow chart that represents the embodiment.
Figure 5:
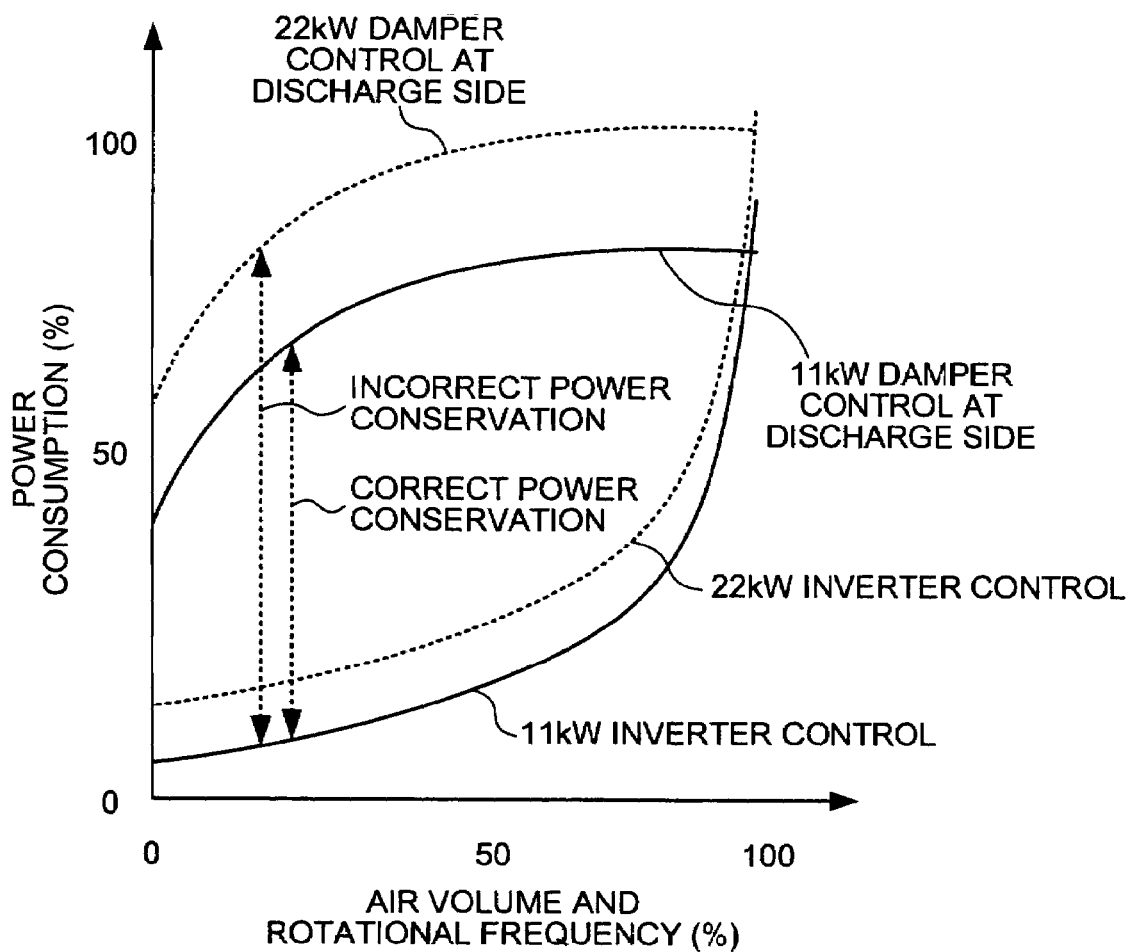
FIG. 5 is a characteristic diagram that represents an error of power saving.

FIG. 4 is a flow chart of a process to obtain an amount of the power-saving effect according to the present embodiment. As shown in FIG. 4, the instantaneous power consumption P' is acquired by the power-consumption computing unit 51 at step 501, the power consumption P1 under the inverter control is obtained according to an actual output frequency at step 502, and judgment on which of the commercial operations at the discharge side and the intake side is subject to comparison in commercial operation is carried out at step 503. If it is determined that the operation at the discharge side is the subject to comparison, the difference P4, which is of the discharge side, is estimated at step 504, and the power-saving effect ΔP is calculated at step 505. If it is determined that the operation at the intake side is the subject to comparison, the difference P5 is estimated at step 506, and the power-saving effect ΔP is calculated at step 507. Then, the power conservation integration value is calculated at step 508.

From the result, the instantaneous power consumption P' is determined, and the differences P4 and P5 are estimated from the electrical characteristic data to acquire the amount of the power-saving effect ΔP, and then, the integration value of power-saving effect ΣΔP is acquired. These determinations do not require special peripheral equipment such as measurement devices, and the integration value of power-saving effect ΣΔP can be calculated only by the inverter control circuit. Because this calculation is carried out by sampling with the CPU; a conventional problem such as roughness in the sampling does not arise.

Moreover, since the power-saving effect ΔP is calculated considering the power (current) that practically changes, accurate values can be calculated according to changes in a load due to external forces, secular deterioration of the devices, environmental changes, and the like.

Furthermore, since the integration value of power-saving effect ΣΔP is accumulated in time series inside the inverter, a transient condition at the time of adjusting speed can be reflected in the integration value accurately.

The power-saving effect ΔP and the integration value of power-saving effect ΣΔP thus acquired are displayed through the display communicating unit 71 on the display 70 that is connected to the CPU 20. In addition, the integration values of power-saving effect, in particular, are accumulated in the nonvolatile memory 60 with taking continuative power-saving effects into consideration.

By providing a display for the power-saving effects in the inverter as described above, displaying the power-saving effects is possible without a computer and other electrical measurement devices. In addition, since the instantaneous power consumption corresponding to an actual operation pattern such as the adjustable speed can be obtained in the inverter, there is an effect that the integration value of the power-saving effect can be acquired with further reduced error. Furthermore, by providing electrical characteristic data under general damper control and under operation with the inverter, and by computing the power-saving effect by multiplying a value of the power consumption under operation with the inverter, it is possible to obtain the power-saving effect accurately according to actual loads applied.

In the embodiment, an example in which the display 70 is provided in the control circuit 2 is explained, but the display 70 may be provided externally to the control circuit 2.

INDUSTRIAL APPLICABILITY

The power-saving effect displaying unit according to the present invention is suitable for an inverter that can acquire accurate power saving according to an actual condition, and that contributes to power conservation.

The invention claimed is:

1. A power-saving effect calculating unit in an inverter that changes operation frequencies of a three-phase alternating current electric motor, comprising:
   a power-consumption computing unit that calculates a power consumption based on an output voltage, which is calculated by an output-voltage computing unit using an output frequency and a bus voltage, and an output current of the inverter; and
   a power-saving-effect generating unit that generates an instantaneous power-saving effect, at the time of a general operation of the inverter as compared to a commercial operation without the inverter, from the instantaneous power consumption at the time of a general operation of the inverter obtained from the power-consumption computing unit and data resulting from a comparison of a first instantaneous power consumption at the time of the general operation of the inverter and a second instantaneous power consumption at the time of the commercial operation without the inverter.

2. The power-saving effect calculating unit according to claim 1, wherein the power-consumption computing unit calculates the power consumption for a plurality of sampling periods, and
   wherein the power-saving-effect generating unit further calculates an integration of the power-saving effect over the sampling periods to obtain an integration value.

3. The power-saving effect calculating unit according to claim 1, further comprising an arrangement that displays at least one of the power-saving effect and an integration value that is calculated by integrating the power-saving effect obtained by the power-saving-effect generating unit over a plurality of time periods.

4. The power-saving effect calculating unit in an inverter according to claim 2, further comprising an arrangement that displays at least one of the power-saving effect and the integration value.

5. A power-saving effect displaying unit in an inverter that changes operation frequencies of a three-phase alternating current electric motor, comprising:
   a power-consumption computing unit that calculates a power consumption under operation with the inverter based on a voltage obtained by an output-voltage computing unit and a current obtained by a current detecting unit, said power consumption being calculated for a sampling period; and
   a power-saving-effect generating unit that generates a power-saving effect based on the power consumption;
   wherein the power-saving effect obtainable under a general operation with the inverter as compared to a commercial operation without the inverter is displayed based on data obtained by comparing a first instantaneous power consumption under the general operation with the inverter and a second instantaneous power consumption under the commercial operation without the inverter, as calculated by the power-consumption computing unit, and
   wherein the power-saving effect is calculated by multiplying a difference between the second instantaneous power consumption under the commercial operation without the inverter and the first instantaneous power consumption under the general operation with the inverter, by a ratio between the power consumption under the operation with the inverter for the sampling period and the first instantaneous power consumption under the general operation of the inverter.

6. A power-saving effect calculating unit in an inverter that changes operation frequencies of a three-phase alternating current electric motor, the power-saving effect calculating unit comprising:
   a power-consumption computing unit that calculates a power consumption under operation with the inverter based on a voltage obtained by an output-voltage computing unit and a current obtained by a current detecting unit, said power consumption being calculated for a sampling period; and
   a power-saving-effect generating unit that generates a power-saving effect based on the power consumption;
   wherein the power-saving effect obtainable under a general operation with the inverter as compared to a commercial operation without the inverter is calculated based on the instantaneous power consumption obtained from the power-consumption computing unit and data obtained by comparing a first instantaneous power consumption under the general operation with the inverter and a second instantaneous power consumption under the commercial operation without the inverter, and
   wherein the power-saving effect is calculated by multiplying a difference between the second instantaneous power consumption under the commercial operation without the inverter and the first instantaneous power consumption under the general operation with the inverter, by a ratio between the power consumption under the operation with the inverter for the sampling period and the first instantaneous power consumption under the general operation of the inverter.

* * * * *